(12) United States Patent
Osaka et al.

(10) Patent No.: US 10,474,068 B2
(45) Date of Patent: Nov. 12, 2019

(54) ELECTRICALLY CONDUCTIVE RUBBER COMPOSITION, TRANSFER ROLLER, AND IMAGE FORMING APPARATUS

(71) Applicant: SUMITOMO RUBBER INDUSTRIES, LTD., Kobe-shi, Hyogo (JP)

(72) Inventors: Keisuke Osaka, Kobe (JP); Yusuke Tanio, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/972,826

(22) Filed: May 7, 2018

(65) Prior Publication Data
US 2018/0335728 A1    Nov. 22, 2018

(30) Foreign Application Priority Data
May 22, 2017    (JP) .................... 2017-101032

(51) Int. Cl.
| | | |
|---|---|---|
| G03G 15/16 | (2006.01) |
| C08J 9/04 | (2006.01) |
| C08J 9/10 | (2006.01) |
| C08K 5/43 | (2006.01) |
| C08J 9/00 | (2006.01) |
| H01B 1/12 | (2006.01) |

(52) U.S. Cl.
CPC ............ *G03G 15/16* (2013.01); *C08J 9/0033* (2013.01); *C08J 9/105* (2013.01); *C08K 5/43* (2013.01); *H01B 1/122* (2013.01); *C08J 9/0061* (2013.01); *C08J 2203/04* (2013.01); *C08J 2205/00* (2013.01); *C08J 2307/00* (2013.01); *C08J 2309/06* (2013.01); *C08J 2463/00* (2013.01); *G03G 15/162* (2013.01); *G03G 15/1685* (2013.01)

(58) Field of Classification Search
CPC ... G03G 15/16; G03G 15/162; G03G 15/1685
See application file for complete search history.

(56) References Cited

U.S. PATENT DOCUMENTS

| | | | | |
|---|---|---|---|---|
| 2011/0281703 A1* | 11/2011 | Tajima | ...................... | C08L 9/02 492/18 |
| 2012/0129667 A1* | 5/2012 | Mizumoto | ......... | G03G 15/1685 492/18 |

FOREIGN PATENT DOCUMENTS

JP    2015-34878 A    2/2015

* cited by examiner

*Primary Examiner* — Ramsey Zacharia
(74) *Attorney, Agent, or Firm* — Birch, Stewart, Kolasch & Birch, LLP

(57) ABSTRACT

An inventive electrically conductive rubber composition contains: a rubber component including SBR and/or NBR, and 20 to 30 parts by mass of epichlorohydrin rubber based on 100 parts by mass of the overall rubber component; a crosslinking component; a foaming component; and a potassium salt of an anion having a fluoro group and a sulfonyl group in its molecule, the potassium salt being present in a proportion of not less than 0.01 part by mass and not greater than 1 part by mass based on 100 parts by mass of the overall rubber component. An inventive transfer roller (1) includes a roller body (2) formed from the electrically conductive rubber composition.

10 Claims, 1 Drawing Sheet

ELECTRICALLY CONDUCTIVE RUBBER COMPOSITION, TRANSFER ROLLER, AND IMAGE FORMING APPARATUS

TECHNICAL FIELD

The present invention relates to an electrically conductive rubber composition, a transfer roller including a roller body formed from the electrically conductive rubber composition, and an image forming apparatus including the transfer roller.

BACKGROUND ART

In an electrophotographic image forming apparatus such as a laser printer, an electrostatic copying machine, a plain paper facsimile machine or a printer-copier-facsimile multifunction machine, a transfer roller is used for transferring a toner image formed on a photoreceptor body onto a surface of a sheet such as a paper sheet or a plastic film.

The transfer roller generally includes a roller body formed from an electrically conductive rubber composition which is prepared by blending rubber, a crosslinking component for crosslinking the rubber, and a foaming agent thermally decomposable to generate gas to foam the rubber and is imparted with electrical conductivity. More specifically, the roller body is produced by forming a tubular body from the electrically conductive rubber composition and crosslinking and foaming the rubber of the tubular body with heating, and then the transfer roller is produced by using the roller body. Acrylonitrile butadiene rubber (NBR) is typically used as the rubber for the roller body.

In Patent Document 1, it is contemplated to use styrene butadiene rubber (SBR) instead of the NBR, to use the foaming agent as well as a foaming assisting agent functioning to reduce the decomposition temperature of the foaming agent to accelerate the decomposition of the foaming agent, and to properly adjust the proportions of the foaming agent and the foaming assisting agent.

With this arrangement, the SBR is lower in unit cost than the NBR, so that the production costs of the transfer roller can be reduced. The foaming reduces the amount of the material to be used, thereby further reducing the costs. Further, the foaming reduces the weight of the transfer roller, thereby reducing the transportation costs and the like.

In addition, it is possible to impart the roller body with flexibility suitable for the transfer roller and to reduce foam cell diameters to improve the smoothness of the outer peripheral surface of the roller body by adjusting the proportions of the foaming agent and the foaming assisting agent within predetermined ranges.

Since the decomposition temperature of the foaming agent is reduced by the blending of the foaming assisting agent, particles of the foaming agent are liable to be decomposed substantially simultaneously in the generally entire tubular body in a very short period from the start of the heating. Thus, expansion of foam cells resulting from the respective foaming agent particles during the foaming is suppressed by mutual expansion power of adjacent foam cells. As a result, the foam cell diameters are reduced.

Therefore, the transfer roller including the aforementioned roller body ensures formation of higher-quality images with the smoothness of the outer peripheral surface of the roller body thus improved, and the cost reduction as described above.

In Patent Document 1, epichlorohydrin rubber for imparting the roller body with ion conductivity and ethylene propylene diene rubber (EPDM) for improving the ozone resistance of the roller body are used together with the SBR as the rubber for the roller body.

CITATION LIST

Patent Document

[PATENT DOCUMENT 1] JP-2015-34878A

SUMMARY OF THE INVENTION

Problem to be Solved by the Invention

With recent globalization of the market of image forming apparatuses, the image forming apparatuses are used in diversified use environments. Therefore, the image forming apparatuses are required to be capable of forming clear images of stable quality in any use environment.

According to studies conducted by the inventor of the present invention, however, the transfer roller imparted with the ion conductivity by the blending of the ion conductive rubber such as the epichlorohydrin rubber is problematically susceptible to significant variations in roller resistance due to differences in temperature and humidity. The roller resistance of the transfer roller is liable to significantly vary due to a difference in place in which an image forming apparatus including the transfer roller is installed, and due to changes in climate and weather even if the image forming apparatus is installed in the same place, thereby influencing the image density and the quality of an image to be formed.

It is contemplated, for example, to prepare an electrically conductive rubber composition by blending, instead of the ion conductive rubber, an ion conductive salt (hereinafter sometimes referred to as "ionic salt") such as a salt of an anion having a fluoro group and a sulfonyl group in its molecule and having a smaller molecular weight than crosslinked rubber. According to studies conducted by the inventor, where the roller body is formed from such an electrically conductive rubber composition, the variations in the roller resistance of the transfer roller due to the difference in use environment can be suppressed as compared with the roller body formed from the electrically conductive rubber composition containing the ion conductive rubber.

However, when the transfer roller including the roller body formed from the electrically conductive rubber composition containing the ionic salt is continuously energized, the roller resistance of the transfer roller is significantly increased from the initial resistance level to influence the image density and the image quality of an image to be formed. This is mainly because the ionic salt is influenced by an external electric field during the continuous energization to thereby move in the roller body. That is, the ionic salt has a smaller molecular weight than the crosslinked rubber as described above, and is liable to be influenced by the external electric field to move in the roller body due to this structural feature.

Therefore, the ionic ion, which is initially uniformly distributed in the roller body, is liable to move to the vicinity of the outer peripheral surface of the roller body due to the continuous energization, or to bloom (deposit) on the outer peripheral surface. Thus, the ionic salt is liable to be present at a lower existence ratio in the roller body, or to be unevenly distributed in the roller body. This supposedly results in significant increase in the roller resistance of the transfer roller. In addition, the ionic salt blooming on the surface is liable to contaminate the photoreceptor body and the like. This may result information of lower-quality images.

It is an object of the present invention to provide an electrically conductive rubber composition to be used for formation of a roller body of a transfer roller which is less susceptible to the variations in roller resistance due to the difference in use environment and the increase in roller resistance during the continuous energization and, therefore, has a stable roller resistance to be capable of continuously forming higher-quality images. It is another object of the present invention to provide a transfer roller including a roller body formed from the electrically conductive rubber composition, and an image forming apparatus including the transfer roller.

Solution to Problem

The present invention provides an electrically conductive rubber composition, which comprises a rubber component, a crosslinking component for crosslinking the rubber component, a foaming component for foaming the rubber component, and a potassium salt of an anion having a fluoro group and a sulfonyl group in its molecule, wherein the rubber component includes epichlorohydrin rubber and at least one selected from the group consisting of SBR and NBR, wherein the epichlorohydrin rubber is present in a proportion of not less than 20 parts by mass and not greater than 30 parts by mass based on 100 parts by mass of the overall rubber component, wherein the potassium salt is present in a proportion of not less than 0.01 part by mass and not greater than 1 part by mass based on 100 parts by mass of the overall rubber component.

The present invention further provides a transfer roller including a tubular roller body comprising a crosslinked and foamed product of the inventive electrically conductive rubber composition, and an image forming apparatus including the transfer roller.

Effects of the Invention

According to the present invention, the electrically conductive rubber composition allows for formation of a roller body of a transfer roller which is less susceptible to the variations in roller resistance due to the difference in use environment and the increase in roller resistance during the continuous energization and, therefore, has a stable roller resistance to be capable of continuously forming higher-quality images. The present invention further provides the transfer roller including the roller body formed from the electrically conductive rubber composition, and the image forming apparatus including the transfer roller.

EMBODIMENTS OF THE INVENTION

<<Electrically Conductive Rubber Composition>>

Figure 1:
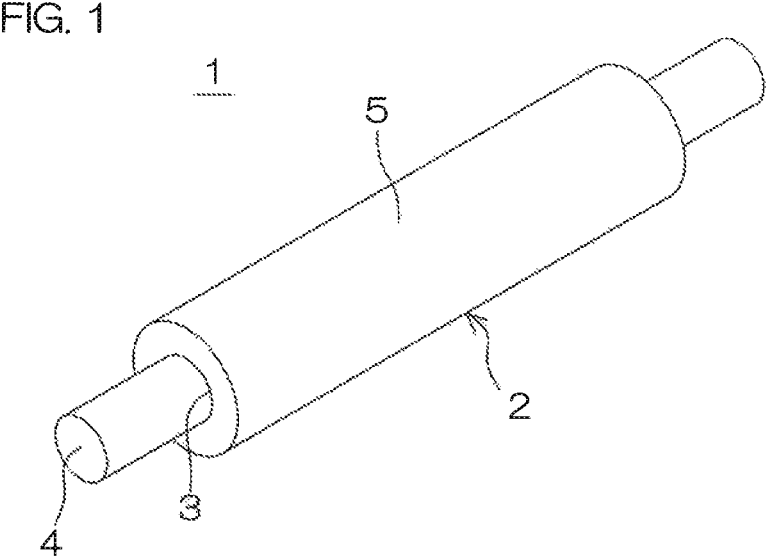
FIG. 1 is a perspective view showing the appearance of an exemplary transfer roller according to one embodiment of the present invention.

An inventive electrically conductive rubber composition comprises a rubber component, a crosslinking component for crosslinking the rubber component, a foaming component for foaming the rubber component, and an ionic salt, particularly a potassium salt of an anion having a fluoro group and a sulfonyl group in its molecule (hereinafter sometimes referred to simply as "potassium salt"), wherein the rubber component includes epichlorohydrin rubber and at least one selected from the group consisting of SBR and NBR, wherein the epichlorohydrin rubber is present in a proportion of not less than 20 parts by mass and not greater than 30 parts by mass based on 100 parts by mass of the overall rubber component, wherein the potassium salt is present in a proportion of not less than 0.01 part by mass and not greater than 1 part by mass based on 100 parts by mass of the overall rubber component.

Where a roller body is formed from the inventive electrically conductive rubber composition, the roller body is entirely imparted with generally uniform ion conductivity by crosslinked epichlorohydrin rubber which is immovable in the roller body even if being influenced by an external electric field. Thus, the increase in roller resistance during the continuous energization is suppressed. Further, the use of a small amount of the potassium salt described above suppresses the variations in roller resistance due to the difference in use environment.

Therefore, the inventive electrically conductive rubber composition allows for formation of a roller body of a transfer roller which is less susceptible to the variations in roller resistance due to the difference in use environment and the increase in roller resistance during the continuous energization and, therefore, has a stable roller resistance to be thereby capable of continuously forming higher-quality images.

Since the inventive electrically conductive rubber composition employs the potassium salt and the epichlorohydrin rubber in combination, it is possible to reduce the proportions of the potassium salt and the epichlorohydrin rubber and to impart the roller body formed from the electrically conductive rubber composition with proper ion conductivity to control the roller resistance of the transfer roller including the roller body within a range suitable for the transfer roller. Therefore, the production costs of the transfer roller can be reduced. Particularly, where SBR is used in combination with the epichlorohydrin rubber for the rubber component, further cost reduction can be achieved by increasing the proportion of the SBR which has a higher cost merit.

<Epichlorohydrin Rubber>

Various ion-conductive polymers each containing epichlorohydrin as a repeating unit are usable as the epichlorohydrin rubber.

Examples of the epichlorohydrin rubber include epichlorohydrin homopolymers, epichlorohydrin-ethylene oxide bipolymers (ECO), epichlorohydrin-propylene oxide bipolymers, epichlorohydrin-allyl glycidyl ether bipolymers, epichlorohydrin-ethylene oxide-allyl glycidyl ether terpolymers (GECO), epichlorohydrin-propylene oxide-allyl glycidyl ether terpolymers and epichlorohydrin-ethylene oxide-propylene oxide-allyl glycidyl ether quaterpolymers, which may be used alone or in combination.

Of these epichlorohydrin rubbers, the ethylene oxide-containing copolymers, particularly the ECO and/or the GECO, are preferred for reducing the roller resistance of the transfer roller to the range suitable for the transfer roller when the potassium salt and the epichlorohydrin rubber are used in combination.

These copolymers preferably each have an ethylene oxide content of not less than 30 mol % and not greater than 80 mol %, particularly preferably not less than 50 mol %.

Ethylene oxide functions to reduce the roller resistance of the transfer roller. If the ethylene oxide content is less than the aforementioned range, however, it will be impossible to sufficiently provide this function and hence to sufficiently reduce the roller resistance of the transfer roller. If the ethylene oxide content is greater than the aforementioned range, on the other hand, ethylene oxide is liable to be crystallized, whereby the segment motion of molecular chains is hindered to adversely increase the roller resistance of the transfer roller. Further, the roller body is liable to have an excessively high hardness after the crosslinking and the foaming, failing to have flexibility suitable for the transfer roller. The electrically conductive rubber composition is liable to have a higher viscosity and, hence, poorer processability and poorer foamability when being heat-melted before the crosslinking.

The ECO has an epichlorohydrin content that is a balance obtained by subtracting the ethylene oxide content from the total. That is, the epichlorohydrin content is preferably not less than 20 mol % and not greater than 70 mol %, particularly preferably not greater than 50 mol %.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization of ethylene oxide is suppressed to reduce the roller resistance of the transfer roller. However, if the allyl glycidyl ether content is less than the aforementioned range, it will be impossible to sufficiently provide this function and, hence, to sufficiently reduce the roller resistance of the transfer roller. Allyl glycidyl ether functions as crosslinking sites during the crosslinking of the GECO. Therefore, if the allyl glycidyl ether content is greater than the aforementioned range, the crosslinking density of the GECO tends to be excessively increased, whereby the segment motion of molecular chains is hindered to adversely increase the roller resistance of the transfer roller.

The GECO has an epichlorohydrin content that is a balance obtained by subtracting the ethylene oxide content and the allyl glycidyl ether content from the total. That is, the epichlorohydrin content is preferably not less than mol % and not greater than 69.5 mol %, particularly preferably not less than 19.5 mol % and not greater than 60 mol %.

Examples of the GECO include copolymers of the three comonomers described above in a narrow sense, as well as known modification products obtained by modifying an epichlorohydrin-ethylene oxide bipolymer (ECO) with allyl glycidyl ether. These epichlorohydrin rubbers may be used alone or in combination.

<SBR>

Usable as the SBR are various crosslinkable SBRs synthesized by copolymerizing styrene and butadiene by an emulsion polymerization method, a solution polymerization method and other various polymerization methods.

According to the styrene content, the SBRs are classified into a higher styrene content type, an intermediate styrene content type and a lower styrene content type, and any of these types of SBRs may be used.

The SBRs include those of an oil-extension type having flexibility controlled by addition of an extension oil, and those of a non-oil-extension type containing no extension oil. In the present invention, a non-oil-extension type SBR which does not contain the extension oil (which may be a bleed substance) is preferably used for the prevention of the contamination of the photoreceptor body. These SBRs may be used alone or in combination.

<NBR>

Usable as the NBR are various crosslinkable NBRs synthesized by copolymerizing acrylonitrile and butadiene by an emulsion polymerization method and other various polymerization methods.

A lower acrylonitrile content type NBR having an acrylonitrile content of not greater than 24%, an intermediate acrylonitrile content type NBR having an acrylonitrile content of 25 to 30%, an intermediate to higher acrylonitrile content type NBR having an acrylonitrile content of 31 to 35%, a higher acrylonitrile content type NBR having an acrylonitrile content of 36 to 42% and a very high acrylonitrile content type NBR having an acrylonitrile content of not less than 43% are usable as the NBR.

The NBRs include those of an oil-extension type having flexibility controlled by addition of an extension oil, and those of a non-oil-extension type containing no extension oil. In the present invention, a non-oil-extension type NBR which does not contain the extension oil (which may be a bleed substance) is preferably used for the prevention of the contamination of the photoreceptor body. These NBRs may be used alone or in combination.

<Other Rubber>

As required, at least one selected from the group consisting of EPDM, chloroprene rubber (CR) and acryl rubber (ACM) may be used for the rubber component. As described above, the use of the EPDM improves the ozone resistance of the roller body. The use of the CR and/or the ACM which are polar rubbers makes it possible to finely control the roller resistance of the transfer roller and to form a uniform porous structure free from foaming unevenness. For this effect, the CR is preferred as the polar rubber.

(EPDM)

Usable as the EPDM are various EPDMs prepared by introducing double bonds to a main chain of the EPDM by addition of a small amount of a third ingredient (diene) to ethylene and propylene.

A variety of EPDM products produced by using different types and different amounts of the third ingredient are commercially available. Typical examples of the third ingredient include ethylidene norbornene (ENB), 1,4-hexadiene (1,4-HD) and dicyclopentadiene (DCP). A Ziegler catalyst is generally used as a polymerization catalyst.

The EPDMs include those of an oil-extension type having flexibility controlled by addition of an extension oil, and those of a non-oil-extension type containing no extension oil. In the present invention, a non-oil-extension type EPDM which does not contain the extension oil (which may be a bleed substance) is preferably used for the prevention of the contamination of the photoreceptor body. These EPDMs may be used alone or in combination.

(CR)

Usable as the CR are various crosslinkable CRs synthesized by emulsion polymerization of chloroprene. The CRs are classified in a sulfur modification type and a non-sulfur-modification type depending on the type of a molecular weight adjusting agent to be used for the emulsion polymerization of chloroprene.

The sulfur modification type CR is synthesized by plasticizing a copolymer of chloroprene and sulfur (molecular weight adjusting agent) with thiuram disulfide or the like to adjust the viscosity of the copolymer to a predetermined viscosity level.

The non-sulfur-modification type CR may be classified, for example, in a mercaptan modification type, a xanthogen modification type or the like.

The mercaptan modification type CR is synthesized in substantially the same manner as the sulfur modification type CR, except that an alkyl mercaptan such as n-dodecyl mercaptan, tert-dodecyl mercaptan or octyl mercaptan, for example, is used as the molecular weight adjusting agent. The xanthogen modification type CR is synthesized in substantially the same manner as the sulfur modification type CR, except that an alkyl xanthogen compound is used as the molecular weight adjusting agent.

The CRs are classified in a lower crystallization speed type, an intermediate crystallization speed type and a higher crystallization speed type depending on the crystallization speed. In the present invention, any of the aforementioned types of CRs may be used. Particularly, a CR of the non-sulfur-modification type and the lower crystallization speed type is preferred.

Further, a copolymer of chloroprene and other comonomer may be used as the CR. Examples of the other comonomer include 2,3-dichloro-1,3-butadiene, 1-chloro-1,3-butadiene, styrene, acrylonitrile, methacrylonitrile, isoprene, butadiene, acrylic acid, acrylates, methacrylic acid and methacrylates, which may be used alone or in combination.

The CRs include those of an oil-extension type having flexibility controlled by addition of an extension oil, and those of a non-oil-extension type containing no extension oil. In the present invention, a non-oil-extension type CR which does not contain the extension oil (which may be a bleed substance) is preferably used for the prevention of the contamination of the photoreceptor body. These CRs may be used alone or in combination.

<Proportions of Rubbers for Rubber Component>

As described above, the proportion of the epichlorohydrin rubber is required to be not less than 20 parts by mass and not greater than 30 parts by mass based on 100 parts by mass of the overall rubber component.

If the proportion of the epichlorohydrin rubber is less than the aforementioned range, it will be impossible to provide the effect of the blending of the epichlorohydrin rubber for imparting the entire roller body with generally uniform ion conductivity as described above. Further, there will be a need for blending a greater amount of the potassium salt (greater than 1 part by mass based on 100 parts by mass of the overall rubber component) to control the roller resistance of the transfer roller in the range suitable for the transfer roller. Therefore, the potassium salt is more liable to move within the roller body during the continuous energization. For these reasons, the transfer roller will suffer from significant increase in roller resistance during the continuous energization. Further, the effect of the combinational use of the epichlorohydrin rubber and the potassium salt for reducing the production costs of the transfer roller will be insufficient.

If the proportion of the epichlorohydrin rubber is greater than the aforementioned range, on the other hand, the variations in roller resistance due to the difference in use environment will be increased even with the combinational use of the epichlorohydrin rubber and the potassium salt. Further, the effect of the combinational use of the epichlorohydrin rubber and the potassium salt for reducing the production costs of the transfer roller will be insufficient.

Where the proportion of the epichlorohydrin rubber falls within the aforementioned range, in contrast, the variations in roller resistance due to the difference in use environment and the increase in roller resistance during the continuous energization are suppressed to stabilize the roller resistance and, therefore, the roller body of the transfer roller formed from the electrically conductive rubber composition is capable of continuously forming higher-quality images. Further, the production costs of the transfer roller can be reduced.

Where the rubber component does not include the other rubber such as the EPDM, the proportion of the SBR and/or the NBR is a balance obtained by subtracting the proportion of the epichlorohydrin rubber from the total. That is, the proportion of the SBR and/or the NBR is not less than 70 parts by mass and not greater than 80 parts by mass based on 100 parts by mass of the overall rubber component. Where either the SBR or the NBR is used in combination with the epichlorohydrin rubber, this proportion means the proportion of the SBR or the NBR. Where both the SBR and the NBR are used in combination with the epichlorohydrin rubber, this proportion means the total proportion of the SBR and the NBR.

Where the rubber component includes the other rubber, the proportion of the other rubber is preferably not less than 5 parts by mass and not greater than 30 parts by mass based on 100 parts by mass of the overall rubber component in order to provide the aforementioned effect of the blending of the other rubber. The proportion of the SBR and/or the NBR is a balance obtained by subtracting the proportions of the epichlorohydrin rubber and the other rubber from the total. That is, the proportion of the SBR and/or the NBR is preferably not less than 40 parts by mass and not greater than 75 parts by mass based on 100 parts by mass of the overall rubber component.

<Potassium Salt>

Examples of the anion having the fluoro group and the sulfonyl group in the molecule of the potassium salt include fluoroalkylsulfonate ions, bis(fluoroalkylsulfonyl)imide ions and tris(fluoroalkylsulfonyl)methide ions, which may be used alone or in combination.

Examples of the fluoroalkylsulfonate ions include $CF_3SO_3^-$ and $C_4F_9SO_3^-$, at least one of which may be used.

Examples of the bis(fluoroalkylsulfonyl)imide ions include $(CF_3SO_2)_2N^-$, $(C_2F_5SO_2)_2N^-$, $(C_4F_9SO_2)(CF_3SO_2)N^-$, $(FSO_2C_6F_4)(CF_3SO_2)N^-$, $(C_8F_{17}SO_2)(CF_3SO_2)N^-$, $(CF_3CH_2OSO_2)_2N^-$, $(CF_3CF_2CH_2OSO_2)_2N^-$, $(HCF_2CF_2CH_2OSO_2)_2N^-$, and $[(CF_3)_2CHOSO_2]_2N^-$, which may be used alone or in combination.

Examples of the tris(fluoroalkylsulfonyl)methide ions include $(CF_3SO_2)_3C^-$ and $(CF_3CH_2OSO_2)_3C^-$, at least one of which may be used.

Lithium salts and sodium salts of the aforementioned anions are also widely used as the ionic salt. However, the lithium salts and the sodium salts are highly moisture-absorbable and highly deliquescent and, therefore, are liable to deliquesce in a higher temperature and higher humidity environment to bloom on the outer peripheral surface of the transfer roller. If such a deliquescing ionic salt blooms, the ionic salt is liable to be present at a reduced existence ratio within the roller body or unevenly distributed in the roller body, resulting in significant increase in the roller resistance of the transfer roller. Further, the ionic salt blooming on the surface is liable to contaminate the photoreceptor body and the like, thereby reducing the quality of images to be formed.

In contrast, potassium salts of the aforementioned anions are less moisture-absorbable and less deliquescent and, therefore, are free from the deliquescence in the higher temperature and higher humidity environment and the blooming on the outer peripheral surface of the transfer roller, thereby eliminating the possibilities of the significant increase in the roller resistance of the transfer roller and the contamination of the photoreceptor body and, hence, the reduction in image quality.

Further, the potassium salts are free from mass change and deliquescence which may otherwise occur due to moisture absorption during weighing thereof. This makes it relatively easy to accurately weigh such a potassium salt. In addition, the electrically conductive rubber composition is easy to handle without batch-to-batch variations in moisture absorption amount.

In order to provide the aforementioned effect and the effect of the blending of the potassium salt for improving the ion conductivity of the electrically conductive rubber composition and reducing the roller resistance of the transfer roller, $(CF_3SO_2)_2NK$ (potassium bis(trifluoromethanesulfonyl)imide) is preferred.

As described above, the proportion of the potassium salt to be blended is required to be not less than 0.01 part by mass and not greater than 1 part by mass, based on 100 parts by mass of the overall rubber component.

If the proportion of the potassium salt is less than the aforementioned range, it will be impossible to provide the effect of the combinational use of the potassium salt and the epichlorohydrin rubber for suppressing the variations in roller resistance due to the difference in use environment. Hence, there will be a need for blending a greater amount of the epichlorohydrin rubber (greater than 30 parts by mass based on 100 parts by mass of the overall rubber component) to control the roller resistance of the transfer roller in the range suitable for the transfer roller. Therefore, the variations in roller resistance are liable to be increased. Further, the effect of the combinational use of the epichlorohydrin rubber and the potassium salt for reducing the production costs of the transfer roller will be insufficient.

If the proportion of the potassium salt is greater than the aforementioned range, on the other hand, the proportion of the epichlorohydrin rubber should be set to less than 20 parts by mass based on 100 parts by mass of the overall rubber component to control the roller resistance of the transfer roller in the range suitable for the transfer roller. This will make it impossible to provide the effect of the blending of the epichlorohydrin rubber for imparting the entire roller body with generally uniform ion conductivity as described above. Therefore, the potassium salt is more liable to move within the roller body, thereby significantly increasing the roller resistance during the continuous energization. Further, the effect of the combinational use of the epichlorohydrin rubber and the potassium salt for reducing the production costs of the transfer roller will be insufficient.

Where the proportion of the potassium salt falls within the aforementioned range, in contrast, the variations in roller resistance due to the difference in use environment and the increase in roller resistance during the continuous resistance and, therefore, the transfer roller including the roller body formed from the electrically conductive rubber composition is capable of continuously forming higher-quality images. Further, the production costs of the transfer roller can be reduced.

<Crosslinking Component>

The crosslinking component for crosslinking the rubber component includes a crosslinking agent, a crosslinking accelerating agent and the like.

(Crosslinking Agent)

Examples of the crosslinking agent include a sulfur crosslinking agent, a thiourea crosslinking agent, a triazine derivative crosslinking agent, a peroxide crosslinking agent and monomers, which may be used alone or in combination. Particularly, the sulfur crosslinking agent is preferred.

Examples of the sulfur crosslinking agent include sulfur such as sulfur powder, oil-treated sulfur powder, precipitated sulfur, colloidal sulfur and dispersive sulfur, and organic sulfur-containing compounds such as tetramethylthiuram disulfide and N,N-dithiobismorpholine. Particularly, the sulfur is preferred.

The proportion of the sulfur to be blended is preferably not less than 0.5 parts by mass and not greater than 2 parts by mass based on 100 parts by mass of the overall rubber component in order to produce the transfer roller including the roller body having flexibility suitable for the transfer roller and less susceptible to compression set with higher productivity by properly crosslinking the rubber component.

Where the oil-treated sulfur powder, the dispersive sulfur or the like is used as the sulfur, for example, the proportion of the sulfur described above is defined as the effective proportion of sulfur contained in the oil-treated sulfur powder or the dispersive sulfur.

Where the organic sulfur-containing compound is used as the sulfur crosslinking agent, the proportion of the organic sulfur-containing crosslinking agent is preferably adjusted so that the proportion of sulfur contained in molecules of the organic sulfur-containing crosslinking agent falls within the aforementioned range based on 100 parts by mass of the overall rubber component.

(Crosslinking Accelerating Agent)

Examples of a crosslinking accelerating agent to be used in combination with the sulfur crosslinking agent include inorganic accelerating agents such as lime, magnesia (MgO) and litharge (PbO), and organic accelerating agents, which may be used alone or in combination. Examples of the organic accelerating agents include a thiazole accelerating agent, a thiuram accelerating agent, a sulfenamide accelerating agent and a dithiocarbamate accelerating agent, which may be used alone or in combination. Of these crosslinking accelerating agents, the thiazole accelerating agent and the thiuram accelerating agent are preferably used in combination.

Examples of the thiazole accelerating agent include 2-mercaptobenzothiazole, di-2-benzothiazolyl disulfide, a zinc salt of 2-mercaptobenzothiazole, a cyclohexylamine salt of 2-mercaptobenzothiazole, 2-(N,N-diethylthiocarbamoylthio)benzothiazole and 2-(4'-morpholinodithio)benzothiazole, which may be used alone or in combination. Particularly, di-2-benzothiazolyl disulfide is preferred.

Examples of the thiuram accelerating agent include tetramethylthiuram monosulfide, tetramethylthiuram disulfide, tetraethylthiuram disulfide, tetrabutylthiuram disulfide, tetrakis(2-ethylhexyl)thiuram disulfide and dipentamethylenethiuram tetrasulfide, which may be used alone or in combination. Particularly, tetramethylthiuram monosulfide is preferred.

In order to sufficiently provide the effect of the combinational use of the aforementioned two types of crosslinking accelerating agents for accelerating the crosslinking reaction, the proportion of the thiazole accelerating agent to be blended is preferably not less than 0.5 parts by mass and not greater than 2 parts by mass based on 100 parts by mass of the overall rubber component, and the proportion of the thiuram accelerating agent to be blended is preferably not less than 0.5 parts by mass and not greater than 2 parts by mass based on 100 parts by mass of the overall rubber component.

<Foaming Component>

A foaming agent which is thermally decomposable to generate gas is used as the foaming component.

(Foaming Agent)

Usable as the foaming agent are various compounds which are thermally decomposable to generate gas.

Examples of the foaming agent include 4,4'-oxybis(benzenesulfonylhydrazide) (OBSH), azodicarbonamide (ADCA) and N,N-dinitrosopentamethylene tetramine (DPT), which may be used alone or in combination. Particularly, OBSH is preferred.

The proportion of the foaming agent such as OBSH is preferably not less than 1 part by mass and not greater than 4 parts by mass based on 100 parts by mass of the overall rubber component. If the proportion of the foaming agent is less than the aforementioned range, particles of the foaming agent will be spaced greater distances from each other in the electrically conductive rubber composition. Therefore, adjacent foam cells resulting from the respective foaming agent particles fail to mutually suppress their expansion by their expansion power. This increases the foam cell diameters as a whole to reduce the smoothness of the outer peripheral surface of the roller body, making it impossible to improve the image quality.

Further, the roller body is liable to have an excessively high hardness after the crosslinking and the foaming, because the electrically conductive rubber composition cannot be sufficiently foamed. This will make it impossible to impart the roller body with flexibility suitable for the transfer roller. If the foaming is insufficient, it will be impossible to sufficiently provide the effect of the foaming for reducing production costs of the transfer roller by reducing the use amount of the material and the effect of the foaming for reducing transportation costs and other costs by reducing the weight of the transfer roller as described above.

If the proportion of the foaming agent is greater than the aforementioned range, on the other hand, the adjacent foam cells expanding due to the foaming are liable to excessively mutually suppress their expansion by their expansion power to thereby each have an excessively small foam cell diameter. Therefore, the roller body is liable to adversely have a higher hardness after the crosslinking and the foaming, failing to have flexibility suitable for the transfer roller.

Where the proportion of the foaming agent falls within the aforementioned range, in contrast, it is possible to moderately reduce the foam cell diameters, while imparting the roller body with proper flexibility and providing the various advantages of the foaming.

The foaming component may include the foaming agent alone, or may include the foaming agent and a foaming assisting agent.

<Foaming Assisting Agent>

Usable as the foaming assisting agent are various compounds functioning to reduce the decomposition temperature of the foaming agent to be used in combination with the foaming assisting agent for acceleration of the decomposition of the foaming agent. Where the foaming agent is the OBSH or the ADCA, for example, urea ($H_2NCONH_2$) foaming assisting agents are preferred.

The proportion of the foaming assisting agent to be blended is preferably not greater than 2.5 parts by mass based on 100 parts by mass of the overall rubber component. The lower limit of the proportion of the foaming assisting agent is 0 part by mass.

<Other Ingredients>

As required, the electrically conductive rubber composition may further contain various additives. Examples of the additives include a crosslinking acceleration assisting agent, an acid accepting agent, a filler, a plasticizing agent, a processing aid and a degradation preventing agent.

Examples of the crosslinking acceleration assisting agent include metal compounds such as zinc oxide (zinc white), fatty acids such as stearic acid, oleic acid and cotton seed fatty acids, and other conventionally known crosslinking acceleration assisting agents, which may be used alone or in combination. The proportions of these crosslinking acceleration assisting agents to be blended are preferably each not less than 0.1 part by mass and not greater than 7 parts by mass based on 100 parts by mass of the overall rubber component.

In the presence of the acid accepting agent, chlorine-containing gases generated from the epichlorohydrin rubber and the CR during the crosslinking are prevented from remaining in the roller body. Thus, the acid accepting agent functions to prevent the inhibition of the crosslinking and the contamination of the photoreceptor body, which may otherwise be caused by the chlorine-containing gases. Any of various substances serving as acid acceptors may be used as the acid accepting agent. Preferred examples of the acid accepting agent include hydrotalcites and Magsarat which are excellent in dispersibility. Particularly, the hydrotalcites are preferred.

Where the hydrotalcites are used in combination with magnesium oxide or potassium oxide, a higher acid accepting effect can be provided, thereby more reliably preventing the contamination of the photoreceptor body. The proportion of the acid accepting agent to be blended is preferably not less than 0.1 part by mass and not greater than 7 parts by mass based on 100 parts by mass of the overall rubber component.

Examples of the filler include zinc oxide, silica, carbon black, clay, talc, calcium carbonate, magnesium carbonate and aluminum hydroxide, which may be used alone or in combination. The blending of the filler improves the mechanical strength and the like of the transfer roller.

Where electrically conductive carbon black is used as the filler, the roller body is imparted with electron conductivity. A preferred example of the electrically conductive carbon black is HAF. The HAF can be homogenously dispersed in the electrically conductive rubber composition and, therefore, impart the transfer roller with more uniform electron conductivity. The proportion of the electrically conductive carbon black to be blended is preferably not less than 1 part by mass and not greater than 10 parts by mass based on 100 parts by mass of the overall rubber component.

Examples of the plasticizing agent include plasticizers such as dibutyl phthalate, dioctyl phthalate and tricresyl phosphate, and waxes such as polar waxes. Examples of the processing aid include metal salts of fatty acids such as zinc stearate. The proportion of the plasticizing agent and/or the processing aid to be blended is preferably not greater than 3 parts by mass based on 100 parts by mass of the overall rubber component.

Examples of the degradation preventing agent include various anti-aging agents and anti-oxidants. The anti-oxidants serve to reduce the environmental dependence of the roller resistance of the transfer roller and to suppress the increase in roller resistance during the continuous energization. Examples of the anti-aging agents include nickel diethyldithiocarbamate and nickel dibutyldithiocarbamate. The proportion of the anti-aging agent to be blended is preferably not less than 0.1 part by mass and not greater than 1 part by mass based on 100 parts by mass of the overall rubber component.

Other examples of the additives include an anti-scorching agent, a lubricant, a pigment, an anti-static agent, a flame retarder, a neutralizing agent, a nucleating agent and a co-crosslinking agent, which may be added in proper proportions to the electrically conductive rubber composition.

<<Transfer Roller>>

FIG. 1 is a perspective view illustrating an exemplary transfer roller according to one embodiment of the present invention.

Referring to FIG. 1, the transfer roller 1 according to this embodiment includes a roller body 2 which is a tubular porous body of a single-layer structure formed of a crosslinked and foamed product of (formed by crosslinking and foaming) the electrically conductive rubber composition containing the ingredients described above. A shaft 4 is inserted through and fixed to a center through-hole 3 of the roller body 2.

The shaft 4 is a unitary member made of a metal such as aluminum, an aluminum alloy or a stainless steel.

The shaft 4 is electrically connected to and mechanically fixed to the roller body 2, for example, via an electrically conductive adhesive agent. Alternatively, a shaft having an outer diameter that is greater than the inner diameter of the through-hole 3 may be used as the shaft 4, and press-inserted into the through-hole 3 to be electrically connected to and mechanically fixed to the roller body 2. These arrangements may be used in combination for the electrical connection and the mechanical fixing of the shaft 4 to the roller body 2.

For production of the transfer roller 1, the electrically conductive rubber composition is first prepared, and extruded into a tubular body by an extruder. Then, the tubular body is cut to a predetermined length, and the rubber component of the electrically conductive rubber composition of the tubular body is crosslinked and foamed in a vulcanization can by pressure and heat.

Subsequently, the crosslinked and foamed tubular body is secondarily crosslinked with heating in an oven or the like, and then cooled. Thereafter, the outer peripheral surface 5 of the resulting roller body 2 is polished to a predetermined outer diameter.

Various polishing methods such as a dry traverse polishing method may be employed for the polishing.

The shaft 4 may be inserted through and fixed to the through-hole 3 at any time between the end of the cutting of the tubular body and the end of the polishing.

However, it is preferred to carry out the secondary crosslinking and the polishing with the shaft 4 inserted through the through-hole 3 after the cutting. This suppresses the warpage and the deformation of the roller body 2, which may otherwise occur due to the expansion and the contraction of the tubular body during the secondary crosslinking. Further, the tubular body may be polished while being rotated about the shaft 4. This improves the working efficiency in the polishing, and suppresses the deflection of the outer peripheral surface 5.

As previously described, the shaft 4 having an outer diameter greater than the inner diameter of the through-hole 3 may be press-inserted into the through-hole 3, or the shaft 4 may be inserted through the through-hole 3 of the tubular body with the intervention of an electrically conductive thermosetting adhesive agent before the secondary crosslinking.

In the former case, the electrical connection and the mechanical fixing between the shaft 4 and the roller body 2 are achieved simultaneously with the press insertion of the shaft 4.

In the latter case, the thermosetting adhesive agent is cured when the tubular body is secondarily crosslinked with heating in the oven, whereby the shaft 4 is electrically connected to and mechanically fixed to the roller body 2.

As described above, these arrangements may be used in combination to achieve the electrical connection and the mechanical fixing between the shaft 4 and the roller body.

In the embodiment shown in FIG. 1, the roller body 2 is of the single-layer structure formed of the crosslinked and foamed product of the specific rubber composition containing the aforementioned ingredients, but may be of a multi-layer structure including two or more layers. In this case, an outermost layer defining the outer peripheral surface may be formed of the crosslinked and foamed product of the specific rubber composition containing the aforementioned ingredients.

<<Roller Resistance>>

<Variations in Roller Resistance Due to Difference in Use Environment>

Figure 2:
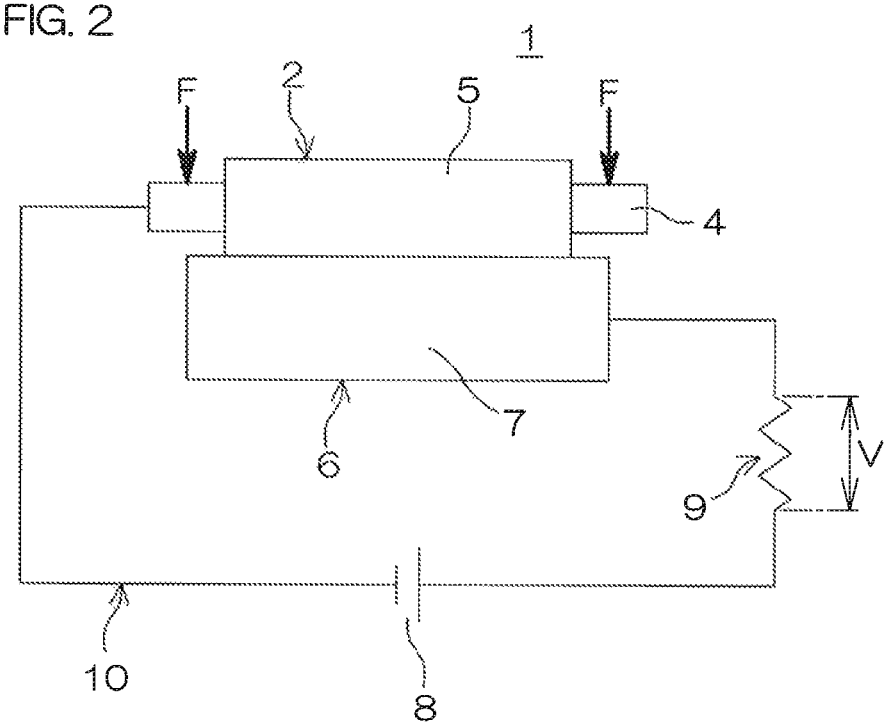
FIG. 2 is a diagram for explaining how to measure the roller resistance of the transfer roller.

FIG. 2 is a diagram for explaining how to measure the roller resistance of the transfer roller.

Referring to FIGS. 1 and 2, the transfer roller 1 is evaluated for variations in the roller resistance thereof due to the difference in use environment based on a roller resistance measured by the following method in the present invention.

More specifically, an aluminum drum 6 rotatable at a constant rotation speed is prepared, and the outer peripheral surface 5 of the roller body 2 of the transfer roller 1 to be subjected to the measurement of the roller resistance is brought into abutment against an outer peripheral surface 7 of the aluminum drum 6 from above.

A DC power source 8 and a resistor 9 are connected in series between the shaft 4 of the transfer roller 1 and the aluminum drum 6 to provide a measurement circuit 10. The DC power source 8 is connected to the shaft 4 at its negative terminal, and connected to the resistor 9 at its positive terminal. The resistance r of the resistor 9 is controlled in a range of 100Ω to 10 kΩ according to the level of the roller resistance so as to maximize the significant figure of the measured roller resistance.

Subsequently, a load F of 500 g is applied to each of opposite end portions of the shaft 4 to bring the roller body 2 into press contact with the aluminum drum 6 and, in this state, an application voltage E of DC 2000 V is applied between the shaft 4 and the aluminum drum 6 from the DC power source 8 while the aluminum drum 6 is rotated (at a rotation speed of 30 rpm). After a lapse of 30 seconds, a detection voltage V applied to the resistor 9 is measured.

The roller resistance R of the transfer roller 1 is basically determined from the following expression (i') based on the measured detection voltage V and the application voltage E (=2000 V):

$$R = r \times E/(V-r) \qquad (i')$$

However, the term $-r$ in the expression (i') is negligible, so that the roller resistance R of the transfer roller 1 is determined from the following expression (i) in the present invention:

$$R = r \times E/V \qquad (i)$$

A roller resistance $R_{LL}$ (Ω) and a roller resistance $R_{HH}$ (Ω) are respectively determined by performing the measurement of the roller resistance R in a lower temperature and lower humidity environment at a temperature of 10° C. at a relative humidity of 20% and in a higher temperature and higher humidity environment at a temperature of 30° C. at a relative humidity of 80%.

Then, a difference $\log R_{LL} - \log R_{HH}$ between a $\log R_{LL}$ value and a $\log R_{HH}$ value of the roller resistances $R_{LL}$ and $R_{HH}$ is determined. A transfer roller having a difference $\log R_{LL} - \log R_{HH}$ of less than 1.4 is rated as having smaller variations (○), and a transfer roller having a difference log $R_{LL}$–log $R_{HH}$ of not less than 1.4 is rated as having greater variations (×).

As apparent from the results for Examples to be described later, the inventive transfer roller 1 is rated as having smaller variations in roller resistance due to the difference in use environment with a difference log $R_{LL}$–log $R_{HH}$ of less than 1.4.

<Increase in Roller Resistance During Continuous Energization>

Referring again to FIGS. 1 and 2, a load F of 500 g is applied to each of the opposite end portions of the shaft 4 to bring the roller body 2 into press contact with the aluminum drum 6 in an ordinary temperature and ordinary humidity environment at a temperature of 23° C. at a relative humidity of 55% and, in this state, an application voltage E of DC 2000 V is continuously applied between the shaft 4 and the aluminum drum 6 from the DC power source 8. During the continuous energization, the rotation of the aluminum drum 6 is stopped, so that the same portion of the roller body 2 is constantly kept in contact with the aluminum drum 6. The resistance r of the resistor 9 is controlled in a range of 100Ω to 10 kΩ according to the level of the roller resistance so as to maximize the significant figure of the measured roller resistance.

Subsequently, a change in detection voltage V applied to the resistor 9 is recorded from the start of the energization. A roller resistance $R_0$ (Ω) at the start of the energization and a roller resistance $R_{30}$ (Ω) after a lapse of 30 minutes from the start of the energization are determined.

Then, the ratio $R_{30}/R_0$ of these roller resistances $R_{30}$ and $R_0$ is determined as a roller resistance increase rate.

A transfer roller having a roller resistance increase rate of less than 1.5 is rated as having a smaller roller resistance increase (○), and a transfer roller having a roller resistance increase rate of not less than 1.5 is rated as having a greater roller resistance increase (×).

As apparent from the results for Examples to be described later, the inventive transfer roller 1 is rated as having a smaller roller resistance increase during the continuous energization with a roller resistance increase rate of less than 1.5.

<<Image Forming Apparatus>>

The inventive image forming apparatus includes the inventive transfer roller. Examples of the image forming apparatus include various electrophotographic image forming apparatuses such as a laser printer, an electrostatic copying machine, a plain paper facsimile machine and a printer-copier-facsimile multifunction machine.

EXAMPLES

The present invention will hereinafter be described in greater detail by way of inventive examples and comparative examples. However, it should be understood that the present invention be not necessarily limited to these examples.

Example 1

A rubber component was prepared by blending 20 parts by mass of GECO (HYDRIN (registered trade name) T3108 available from Zeon Corporation) and 80 parts by mass of NBR (non-oil-extension and lower-acrylonitrile-content type NBR JSR N250 SL available from JSR Co., Ltd. and having an acrylonitrile content of 20%).

While 100 parts by mass of the rubber component was simply kneaded by means of a Banbury mixer, the following ingredients were added to and kneaded with the rubber component.

TABLE 1

| Ingredients | Parts by mass |
| --- | --- |
| Filler | 10 |
| Foaming agent | 4 |
| Potassium salt | 1 |
| Crosslinking acceleration assisting agent I | 1 |
| Crosslinking acceleration assisting agent II | 5 |
| Acid accepting agent | 1.5 |

The ingredients shown in Table 1 are as follows. The amounts (parts by mass) of the respective ingredients shown in Table 1 are based on 100 parts by mass of the overall rubber component.

Filler: Carbon black HAF (SEAST 3 available from Tokai Carbon Co., Ltd.)
Foaming agent: OBSH (NEOCELLBON (registered trade name) N#1000S available from Eiwa Chemical Industry Co., Ltd.)
Potassium salt: Potassium bis(trifluoromethanesulfonyl)imide (EF-N112 available from Mitsubishi Materials Electronic Chemicals Co., Ltd.)
Crosslinking acceleration assisting agent I: Stearic acid (TSUBAKI available from NOF Corporation)
Crosslinking acceleration assisting agent II: Zinc oxide Type-2 (available from Mitsui Mining & Smelting Co., Ltd.)
Acid accepting agent: Hydrotalcites (DHT-4A (registered trade name) 2 available from Kyowa Chemical Industry Co., Ltd.)

While the resulting mixture was continuously kneaded, the following crosslinking component was further added to and kneaded with the mixture. Thus, an electrically conductive rubber composition was prepared.

TABLE 2

| Ingredients | Parts by mass |
| --- | --- |
| Sulfur crosslinking agent | 1.6 |
| Crosslinking accelerating agent DM | 1.6 |
| Crosslinking accelerating agent TS | 2.0 |

The ingredients shown in Table 2 are as follows. The amounts (parts by mass) of the respective ingredients shown in Table 2 are based on 100 parts by mass of the overall rubber component.

Sulfur crosslinking agent: Sulfur powder (available from Tsurumi Chemical Industry Co., Ltd.)
Crosslinking accelerating agent DM: Di-2-benzothiazolyl disulfide (thiazole accelerating agent SUNSINE MBTS available from Shandong Shanxian Chemical Co., Ltd.)
Crosslinking accelerating agent TS: Tetramethylthiuram monosulfide (thiuram accelerating agent SANCELER (registered trade name) TS available from Sanshin Chemical Industry Co., Ltd.)

(Transfer Roller)

The electrically conductive rubber composition thus prepared was fed into an extruder, and extruded into a tubular body having an outer diameter of 20 mm and an inner diameter of 8.5 mm. Then, the tubular body was cut to a predetermined length, and fitted around a temporary crosslinking shaft having an outer diameter of 2.2 mm.

Then, the resulting tubular body was pressurized and heated at 135° C. for 10 minutes and then at 160° C. for 20 minutes in a vulcanization can by pressurized steam, whereby the tubular body was foamed by gas generated by decomposition of the foaming agent and the rubber component was crosslinked.

Subsequently, the tubular body was removed from the temporary shaft, and then fitted around a shaft having an outer diameter of 12 mm and an outer peripheral surface to which an electrically conductive thermosetting adhesive agent was applied. The resulting tubular body was heated in an oven at 160° C. for 60 minutes, whereby the rubber component of the tubular body was secondarily crosslinked and the thermosetting adhesive agent was cured. Thus, the tubular body was electrically connected to and mechanically fixed to the shaft.

In turn, opposite end portions of the tubular body were cut, and the outer peripheral surface of the resulting tubular body was traverse-polished to an outer diameter of 24 mm (with a tolerance of ±0.1 mm) by means of a cylindrical polishing machine. Thus, a roller body was formed to produce a transfer roller.

Example 2

An electrically conductive rubber composition was prepared and a transfer roller was produced in substantially the same manner as in Example 1, except that the proportion of the foaming agent was 2.5 parts by mass based on 100 parts by mass of the overall rubber component.

Example 3

An electrically conductive rubber composition was prepared and a transfer roller was produced in substantially the same manner as in Example 1, except that the proportion of the GECO and the proportion of the NBR were 30 parts by mass and 70 parts by mass, respectively, and the proportion of the potassium salt and the proportion of the foaming agent were 0.5 parts by mass and 2.5 parts by mass, respectively, based on 100 parts by mass of the overall rubber component.

Comparative Example 1

An electrically conductive rubber composition was prepared and a transfer roller was produced in substantially the same manner as in Example 1, except that the proportion of the GECO and the proportion of the NBR were 30 parts by mass and 70 parts by mass, respectively, and the potassium salt was not blended.

Comparative Example 2

An electrically conductive rubber composition was prepared and a transfer roller was produced in substantially the same manner as in Example 1, except that the proportion of the NBR was 100 parts by mass and the GECO was not blended, and the proportion of the potassium salt was 3 parts by mass based on 100 parts by mass of the overall rubber component.

Comparative Example 3

An electrically conductive rubber composition was prepared and a transfer roller was produced in substantially the same manner as in Example 1, except that the proportion of the potassium salt and the proportion of the foaming agent were 1.5 parts by mass and 2.5 parts by mass, respectively, based on 100 parts by mass of the overall rubber component.

Comparative Example 4

An electrically conductive rubber composition was prepared and a transfer roller was produced in substantially the same manner as in Example 1, except that the proportion of the GECO and the proportion of the NBR were 30 parts by mass and 70 parts by mass, respectively, and the proportion of the foaming agent was 0.8 parts by mass based on 100 parts by mass of the overall rubber component, and the potassium salt was not blended.

<Variations in Roller Resistance Due to Difference in Use Environment>

The transfer rollers produced in Examples and Comparative Examples were evaluated for variations in roller resistance due to difference in use environment (environment-dependent variations) by the method described above.

<Increase in Roller Resistance During Continuous Energization>

The transfer rollers produced in Examples and Comparative Examples were evaluated for increase in roller resistance during continuous energization (increase due to energization) by the method described above.

The evaluation results are shown in Table 3.

TABLE 3

|  | Example 1 | Example 2 | Example 3 | Comparative Example 1 | Comparative Example 2 | Comparative Example 3 | Comparative Example 4 |
|---|---|---|---|---|---|---|---|
| Parts by mass | | | | | | | |
| GECO | 20 | 20 | 30 | 30 | — | 20 | 30 |
| NBR | 80 | 80 | 70 | 70 | 100 | 80 | 70 |
| SBR | — | — | — | — | — | — | — |
| Potassium salt | 1 | 1 | 0.5 | — | 3 | 1.5 | — |
| Foaming agent | 4 | 2.5 | 2.5 | 4 | 4 | 2.5 | 0.8 |
| Evaluation for roller resistance | | | | | | | |
| Environment-dependent variations | ○ | ○ | ○ | x | ○ | ○ | x |
| Increase due to energization | ○ | ○ | ○ | ○ | x | x | ○ |

The results for Examples 1 to 3 and Comparative Examples 1 to 4 shown in Table 3 indicate that, where the epichlorohydrin rubber is used in a proportion of not less than 20 parts by mass and not greater than 30 parts by mass based on 100 parts by mass of the overall rubber component in combination with the NBR and the proportion of the potassium salt is not less than 0.01 part by mass and not greater than 1 part by mass based on 100 parts by mass of the overall rubber component, the variations in roller resistance due to the difference in use environment and the increase in roller resistance during the continuous energization can be suppressed to stabilize the roller resistance and, therefore, the transfer roller is capable of continuously forming higher-quality images.

Example 4

An electrically conductive rubber composition was prepared and a transfer roller was produced in substantially the same manner as in Example 1, except that SBR (non-oil-extension type SBR1502 available from Sumitomo Chemical Co., Ltd.) was blended instead of the NBR in the same proportion.

Example 5

An electrically conductive rubber composition was prepared and a transfer roller was produced in substantially the same manner as in Example 4, except that the proportion of the foaming agent was 2.5 parts by mass based on 100 parts by mass of the overall rubber component.

Example 6

An electrically conductive rubber composition was prepared and a transfer roller was produced in substantially the same manner as in Example 4, except that the proportion of the GECO and the proportion of the SBR were 30 parts by mass and 70 parts by mass, respectively, and the proportion of the potassium salt and the proportion of the foaming agent were 0.5 parts by mass and 2.5 parts by mass, respectively, based on 100 parts by mass of the overall rubber component.

Comparative Example 5

An electrically conductive rubber composition was prepared and a transfer roller was produced in substantially the same manner as in Example 4, except that the proportion of the GECO and the proportion of the SBR were 30 parts by mass and 70 parts by mass, respectively, and the potassium salt was not blended.

Comparative Example 6

An electrically conductive rubber composition was prepared and a transfer roller was produced in substantially the same manner as in Example 4, except that the proportion of the SBR was 100 parts by mass and the GECO was not blended, and the proportion of the potassium salt was 3 parts by mass based on 100 parts by mass of the overall rubber component.

Comparative Example 7

An electrically conductive rubber composition was prepared and a transfer roller was produced in substantially the same manner as in Example 4, except that the proportion of the potassium salt and the proportion of the foaming agent were 1.5 parts by mass and 2.5 parts by mass, respectively, based on 100 parts by mass of the overall rubber component.

Comparative Example 8

An electrically conductive rubber composition was prepared and a transfer roller was produced in substantially the same manner as in Example 4, except that the proportion of the GECO and the proportion of the SBR were 30 parts by mass and 70 parts by mass, respectively, and the proportion of the foaming agent was 0.8 parts by mass based on 100 parts by mass of the overall rubber component, and the potassium salt was not blended.

The transfer rollers produced in Examples and Comparative Examples were evaluated for variations in roller resistance due to difference in use environment (environment-dependent variations) and increase in roller resistance during continuous energization (increase due to energization). The evaluation results are shown in Table 4.

TABLE 4

|  | Example 4 | Example 5 | Example 6 | Comparative Example 5 | Comparative Example 6 | Comparative Example 7 | Comparative Example 8 |
| --- | --- | --- | --- | --- | --- | --- | --- |
| Parts by mass | | | | | | | |
| GECO | 20 | 20 | 30 | 30 | — | 20 | 30 |
| NBR | — | — | — | — | — | — | — |
| SBR | 80 | 80 | 70 | 70 | 100 | 80 | 70 |
| Potassium salt | 1 | 1 | 0.5 | — | 3 | 1.5 | — |
| Foaming agent | 4 | 2.5 | 2.5 | 4 | 4 | 2.5 | 0.8 |
| Evaluation for roller resistance | | | | | | | |
| Environment-dependent variations | ○ | ○ | ○ | x | x | ○ | x |
| Increase due to energization | ○ | ○ | ○ | ○ | x | x | ○ |

The results for Examples 4 to 6 and Comparative Examples 5 to 8 shown in Table 4 indicate that the combinational use of the epichlorohydrin rubber and the SBR provides the same results as the combinational use of the epichlorohydrin rubber and the NBR. That is, where the proportion of the epichlorohydrin rubber is not less than 20 parts by mass and not greater than 30 parts by mass based on 100 parts by mass of the overall rubber component and the proportion of the potassium salt is not less than 0.01 part by mass and not greater than 1 part by mass based on 100 parts by mass of the overall rubber component, the variations in roller resistance due to the difference in use environment and the increase in roller resistance during the continuous energization can be suppressed to stabilize the roller resistance and, therefore, the transfer roller is capable of continuously forming higher-quality images.

Further, comparison of Examples 1 to 6 indicates that, where the SBR having a higher cost merit is used in combination with the epichlorohydrin rubber, further cost reduction can be achieved.

This application corresponds to Japanese Patent Application No. 2017-101032 filed in the Japan Patent Office on May 22, 2017, the disclosure of which is incorporated herein by reference in its entirety.

What is claimed is:

1. An electrically conductive rubber composition for a transfer roller comprising:
    a rubber component;
    a crosslinking component for crosslinking the rubber component;
    a foaming component for foaming the rubber component; and
    a potassium salt of an anion having a fluoro group and a sulfonyl group in its molecule;
    wherein the rubber component includes epichlorohydrin rubber and at least one selected from the group consisting of styrene butadiene rubber and acrylonitrile butadiene rubber;
    wherein the epichlorohydrin rubber is present in a proportion of not less than 20 parts by mass and not greater than 30 parts by mass based on 100 parts by mass of the overall rubber component;
    wherein the potassium salt is potassium bis(trifluoromethanesulfonyl)imide;
    wherein the potassium salt is present in a proportion of not less than 0.01 part by mass and not greater than 1 part by mass based on 100 parts by mass of the overall rubber component.

2. The electrically conductive rubber composition according to claim 1,
    wherein the foaming component includes 4,4'-oxybis(benzenesulfonylhydrazide),
    wherein 4,4'-oxybis(benzenesulfonylhydrazide) is present in a proportion of not less than 1 part by mass and not greater than 4 parts by mass based on 100 parts by mass of the overall rubber component.

3. The electrically conductive rubber composition according to claim 2,
    wherein the rubber component further includes at least one selected from the group consisting of ethylene propylene diene rubber, chloroprene rubber and acryl rubber.

4. A transfer roller comprising a tubular roller body comprising a crosslinked and foamed product of the electrically conductive rubber composition according to claim 3.

5. A transfer roller comprising a tubular roller body comprising a crosslinked and foamed product of the electrically conductive rubber composition according to claim 2.

6. The electrically conductive rubber composition according to claim 1,
    wherein the rubber component further includes at least one selected from the group consisting of ethylene propylene diene rubber, chloroprene rubber and acryl rubber.

7. A transfer roller comprising a tubular roller body comprising a crosslinked and foamed product of the electrically conductive rubber composition according to claim 6.

8. A transfer roller comprising a tubular roller body comprising a crosslinked and foamed product of the electrically conductive rubber composition according to claim 1.

9. An image forming apparatus comprising the transfer roller according to claim 8.

10. The electrically conductive rubber composition according to claim 1,
    wherein a proportion of the styrene butadiene rubber and/or the acrylonitrile butadiene rubber is not less than 70 parts by mass and not greater than 80 parts by mass based on 100 parts by mass of the overall rubber component.

* * * * *